(12) United States Patent
Gupta et al.

(10) Patent No.: US 10,830,105 B2
(45) Date of Patent: Nov. 10, 2020

(54) SYSTEM AND METHOD FOR IMPROVING OUTPUT AND HEAT RATE FOR A LIQUID NATURAL GAS COMBINED CYCLE POWER PLANT

(71) Applicant: General Electric Company, Schenectady, NY (US)

(72) Inventors: Abhijit Gupta, Bangalore (IN); Cheng Eng Cong, Kuala Lumpur (MY); Adrianto Darmoyo, Jakarta (ID); Raub Smith, Ballston Lake, NY (US)

(73) Assignee: General Electric Company, Schenectady, NY (US)

( * ) Notice: Subject to any disclaimer, the term of this patent is extended or adjusted under 35 U.S.C. 154(b) by 821 days.

(21) Appl. No.: 15/375,290

(22) Filed: Dec. 12, 2016

(65) Prior Publication Data
US 2018/0163570 A1    Jun. 14, 2018

(51) Int. Cl.
*F01K 3/18*       (2006.01)
*F02C 7/224*     (2006.01)
(Continued)

(52) U.S. Cl.
CPC .............. *F01K 3/185* (2013.01); *F01K 7/16* (2013.01); *F02C 3/22* (2013.01); *F02C 7/16* (2013.01);
(Continued)

(58) Field of Classification Search
None
See application file for complete search history.

(56) References Cited

U.S. PATENT DOCUMENTS

| | | | | |
|---|---|---|---|---|
| 5,295,350 A | * | 3/1994 | Child | F01K 23/068 60/780 |
| 6,367,258 B1 | * | 4/2002 | Wen | F02C 3/22 60/641.1 |

(Continued)

FOREIGN PATENT DOCUMENTS

EP    0605159 A1    7/1994

OTHER PUBLICATIONS

Gowda, et al., Design of Chiller Type Inlet Air Cooling System to Enhance the Performance of Combined Cycle Power Plant, International Journal of Engineering Research & Technology (IJERT), vol. 3, Issue 6, www.ijert.org, Jun. 2014, pp. 1834-1840.
(Continued)

*Primary Examiner* — Steven M Sutherland
*Assistant Examiner* — Rodolphe Andre Chabreyrie
(74) *Attorney, Agent, or Firm* — Dority & Manning, P.A.

(57) ABSTRACT

A combined cycle power plant and heating and cooling system and method for the power plant is disclosed as having a liquid natural gas supply and a vaporizer configured to vaporize the liquid natural gas into natural gas that is supplied to a gas performance heater before entering a combustion section of a gas turbine. A closed cooling water circuit is in fluid communication with at least one power plant component such as a gas turbine inlet heating/cooling coil, a heat recovery heat exchanger, the vaporizer, and mixtures thereof. An open cooling water circuit is in fluid communication with at least one power plant component such as at least one steam turbine condenser, the heat recovery heat exchanger, and mixtures thereof.

8 Claims, 3 Drawing Sheets

(51) Int. Cl.
  *F02C 7/16* (2006.01)
  *F02C 3/22* (2006.01)
  *F01K 7/16* (2006.01)

(52) U.S. Cl.
  CPC ........ *F02C 7/224* (2013.01); *F05D 2260/213* (2013.01); *Y02E 20/16* (2013.01)

(56) References Cited

U.S. PATENT DOCUMENTS

| | | | |
|---|---|---|---|
| 6,374,591 B1* | 4/2002 | Johnson | F01K 23/10 60/783 |
| 7,574,856 B2 | 8/2009 | Mak | |
| 7,980,081 B2* | 7/2011 | Mak | F01K 9/003 60/779 |
| 8,356,466 B2 | 1/2013 | Motakef et al. | |
| 8,631,660 B2 | 1/2014 | Pemmi et al. | |
| 8,813,471 B2* | 8/2014 | Gulen | F02C 6/18 60/39.182 |
| 9,376,962 B2* | 6/2016 | Pang | F02C 7/224 |
| 9,404,393 B2 | 8/2016 | Pang et al. | |
| 2007/0017207 A1* | 1/2007 | Smith | F01K 21/047 60/39.182 |
| 2010/0319384 A1 | 12/2010 | Zhang et al. | |
| 2012/0317988 A1* | 12/2012 | Gardiner | F02C 6/18 60/772 |
| 2016/0215656 A1* | 7/2016 | Yagita | F02G 5/04 |

OTHER PUBLICATIONS

Ibrahim, et el., Improvement of gas turbine performance based on inlet air cooling systems: A Technical Review, International Journal of Physical Sciences, vol. 6(4), Academic Journals, Feb. 18, 2011, pp. 620-627.

Salem, et al., Liquified Natural Gas Energy Conversion Power Plant (LNGTEC), Rochester Institute of Technology, pp. 113-118.

Defensive Publication IPCOM000228885D filed Jul. 10, 2013.

* cited by examiner

SYSTEM AND METHOD FOR IMPROVING OUTPUT AND HEAT RATE FOR A LIQUID NATURAL GAS COMBINED CYCLE POWER PLANT

FIELD OF THE DISCLOSURE

The disclosure relates generally to a system and method for improving the output and heat rate of a Liquefied Natural Gas (LNG) fired combined cycle power generation plant and in particular to an improved apparatus for producing power by circulating plant closed cooling water (CCW) in a combined cycle power plant. LNG or Liquefied Petroleum Gas (LPG) can be used as a gas turbine fuel while utilizing cold energy associated with the vaporization of the LNG/LPG to chill inlet air to the gas turbine, cool the steam turbine condenser cooling water, and cool other combined cycle heat rejection equipment such as the generator.

BACKGROUND OF THE DISCLOSURE

Combined cycle power plants use both steam and gas turbines to generate power. Typically, combined cycle power plants utilize heat from the gas turbine exhaust to boil water to generate steam. These typical combined cycle plants are referred to as heat recovery steam generator (HRSG). The steam generated is utilized to power a steam turbine in the combined cycle plant. The gas turbine and the steam turbine can be utilized to separately power independent generators, or in the alternative, the steam turbine can be combined with the gas turbine to jointly drive a single generator via a common drive shaft.

LNG and LPG have been utilized in combined cycle power plants as a fuel for the gas turbines. The advent of larger and more reliable gas turbines for generator drivers has been a key factor for increasing utilization of LNG/LPG as a power generation fuel for such gas turbines. Gas turbines can generate high volumes of heated exhaust gases. These heated gases can then be utilized to boil water and generate steam in a HRSG. The steam generated from the heated gas turbine exhaust is then used to drive a steam turbine, which in turn drives another power generator.

Combined cycle generation plants manifest various different arrangements and configurations. The thermal efficiency of a combined cycle generation plant, however, can approach 60% as compared to the thermal efficiency range of only 38% to 41% for a conventional steam turbine-only power generation plant without a combined steam and gas turbine.

Gas fuel supply, however, has been a problem for the combined cycle power generation plants. LNG/LPG gas liquefaction, transportation, unloading, storage, vaporization, and utilization for power generation and/or feeding the existing pipelines is a major undertaking entailing large capital investments. Because of these higher capital costs, LNG has typically been economically viable only for largest pipelines and power generation projects.

Privatization of the energy and infrastructure sectors in many developing countries is another factor in the growing utilization of LNG for power generation in combined cycle power generation plants. Capital expenses can be saved in project development and construction costs by integrating the design, procurement, and construction of LNG/LPG receiving terminals with a combined cycle power generation plant utilizing LNG/LPG as a fuel supply. Some of the factors contributing to these huge savings include the optimization of LNG/LPG vaporization cold energy capture and utilization; optimization of the LNG/LPG combined cycle plant facility layout based on safety and energy efficient design considerations; integration of fuel unloading piers with water intake and discharge structures; integration of site development plans; utilization of common facilities for fire-fighting, cooling water, electrical systems, administration and warehouse facilities; use of common non-manual construction staff; and finally integration of the construction schedules.

Moreover, with the increased demand for cleaner fuels, LNG now plays an even greater role in power generation, especially in countries that have to import natural gas. Since a great deal of energy is required to liquefy natural gas, an efficient capture of LNG cold energy associated with LNG vaporization can significantly improve a combined cycle power plant project's cost effectiveness. One feasible scenario is the "integrated energy" approach. The integrated energy approach entails developing a single integrated project including all the steps from generating natural gas fuel via LNG liquefaction all the way through burning the fuel for power generation. The integrated energy approach has proven to be superior to sequentially developing independent projects along the energy supply line. Thus, the integrated energy approach is emerging as the preferred method because of its significantly lower project development and installation costs. The LNG/LPG vaporization 'cold' can be used to chill and increase the density of intake air to the gas turbines and to cool steam turbine condenser cooling water to increase their efficiencies. The combined cycle plants provide higher efficiency than conventional steam power plants, however, a significant amount of energy is wasted. Typically energy is wasted that is generated in the form of heat from the combined cycle plant steam turbine condensers, heat from air passing into the gas turbine and cold energy generated during LNG vaporization.

Thus there is a need to capture this heat and cold energy which is a by-product of the combine cycle power generation plants using LNG/LPG. There is also a need to utilize LNG cold energy generated during LNG vaporization for chilling/heating the air supply to gas turbines and to cool condenser water to increase the output and efficiency of a combined cycle power plant.

BRIEF DESCRIPTION OF THE DISCLOSURE

Aspects and advantages of the disclosure will be set forth in part in the following description, or may be obvious from the description, or may be learned through practice of the disclosure.

A combined cycle power plant heating and cooling system and method is disclosed as having a liquid natural gas supply and a vaporizer configured to vaporize the liquid natural gas into natural gas that is supplied to a gas performance heater before entering a combustion section of a gas turbine. A closed cooling water circuit is in fluid communication with at least one power plant component such as a gas turbine inlet heating/cooling coil, a heat recovery heat exchanger, the vaporizer, and mixtures thereof. The vaporizer is configured such that vaporized cooling is recovered by the closed cooling water circuit and transferred to at least one cooled power plant component. An open cooling water circuit is in fluid communication with at least one power plant component such as at least one steam turbine condenser, the heat recovery heat exchanger, and mixtures thereof. The at least one steam turbine condenser is configured such that waste heat is recovered by the open cooling water circuit and transferred to at least one heated power plant component via the heat recovery heat exchanger.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure, including the best mode thereof, directed to one of ordinary skill in the art, is set forth in the specification, which makes reference to the appended figures, in which.

Figure 1:
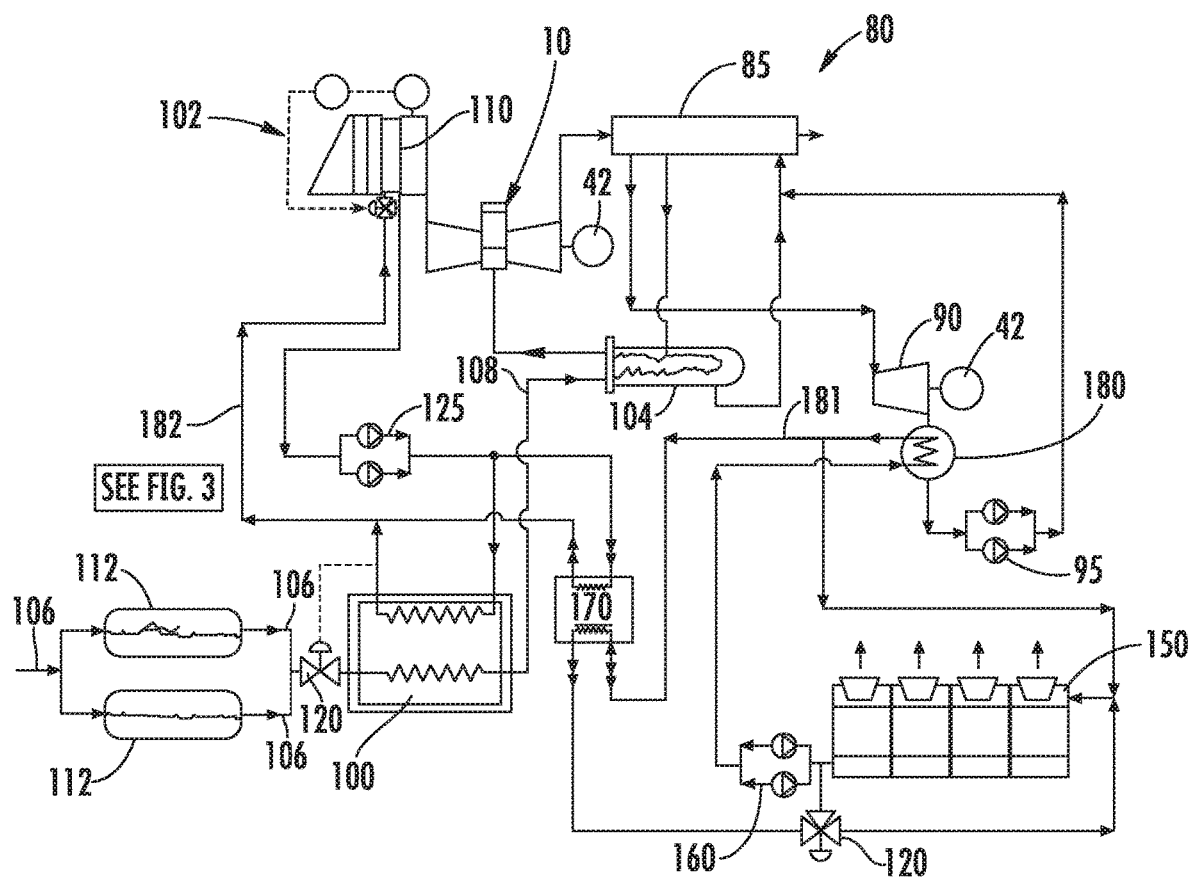
FIG. 1 is a schematic of the plant closed cooling water (CCW) loop and open cooling water (OCW) loop in a combined cycle power station with an LNG/LPG vaporizer.

Repeat use of reference characters in the present specification and drawings is intended to represent the same or analogous features or elements of the present disclosure.

DETAILED DESCRIPTION OF THE DISCLOSURE

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component. The terms "hot", "warm", "cold", and "cool", are used in a relative sense. No limitation on the applicable temperature range is intended herein.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of an industrial gas turbine for purposes of illustration, one of ordinary skill in the art will readily appreciate that embodiments of the present invention may be applied to any turbomachine including but not limited to an aero-derivative turbine, marine gas turbine as well as an aero engine turbine, unless specifically recited in the claims.

An improved apparatus for producing power is accomplished by circulating a plant closed cooling water (CCW) circuit in a combined cycle power plant using Liquefied Natural Gas (LNG) or Liquefied Petroleum Gas (LPG) as a gas turbine fuel and utilizing the cold energy associated with the vaporization of the LNG/LPG to chill inlet air to the gas turbine via the closed cooling water (CCW) system. Also, during low ambient temperature conditions and/or when LNG/LPG vaporization requirements exceed the chilling load of the gas turbine inlet air, the LNG/LPG cold energy is used to cool the steam turbine condenser cooling water, referred to herein as the open cooling water circuit, thereby increasing the steam turbine efficiency and output.

Figure 2:
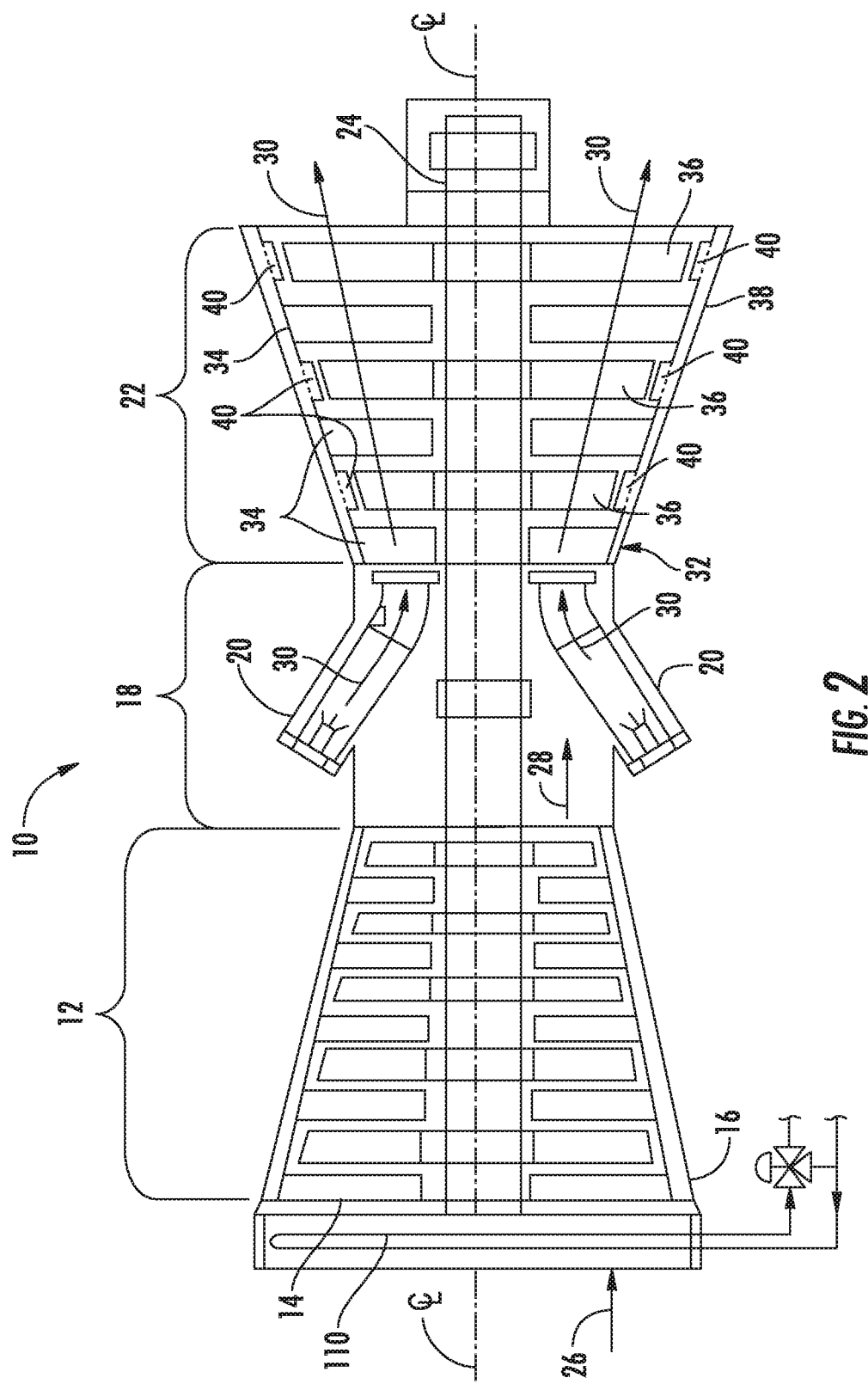
FIG. 2 is a diagram of a typical gas turbine portion of a combined cycle power station with inlet cooling.

Referring now to the drawings, wherein like numerals refer to like components, the example in FIGS. 1 and 2 show a combined cycle power plant 80 including a gas turbine engine system 10 with a compressor section 12, combustion section 18, and a turbine section 22. The power plant 80 further includes a steam turbine 90 engine system. The steam turbine engine system 90 drives an electric generator 42 that produces electrical power. The gas turbine engine system 10, the steam turbine engine system 90 and the generator 42 may be arranged on a single shaft. Other configurations may be used.

The steam turbine engine system 90 is associated with a multi-pressure heat recovery steam generator (HRSG) 85. The HRSG 85 is a counter flow heat exchanger in which feedwater that passes through the HRSG 85 is heated by exhaust gas output from the gas turbine engine system 10. The HRSG 85 can have three (3) different operating pressures (high, intermediate, and low) with components to generate steam at the various pressures and temperatures. This steam is used as vapor feed to the corresponding stages of the steam turbine engine system 90. The HRSG 85 may include one or more economizers, evaporators and/or superheaters.

A LNG vaporizer 100 is incorporated into the closed cooling water (CCW) circuit 182 to capture waste heat and utilize the cold energy available in LNG 106 as a heat sink for the CCW 182 system. The LNG vaporizer 100 converts LNG 106 to NG 108 by vaporizing the LNG 106 and cooling the CCW 182, when needed, prior to entering the gas performance heater 104. The cold energy available from the LNG vaporizer 100 cools the closed cooling water (CCW) circuit 182 that includes an inlet air heating and cooling system 102 to cool the ambient air 26 to the inlet of the gas turbine 10 when needed, thereby fully utilizing the cold energy available from the LNG 106. The NG 108 required for gas turbine combustion is provided from the vaporizer 100 via performance heater 104.

Figure 3:
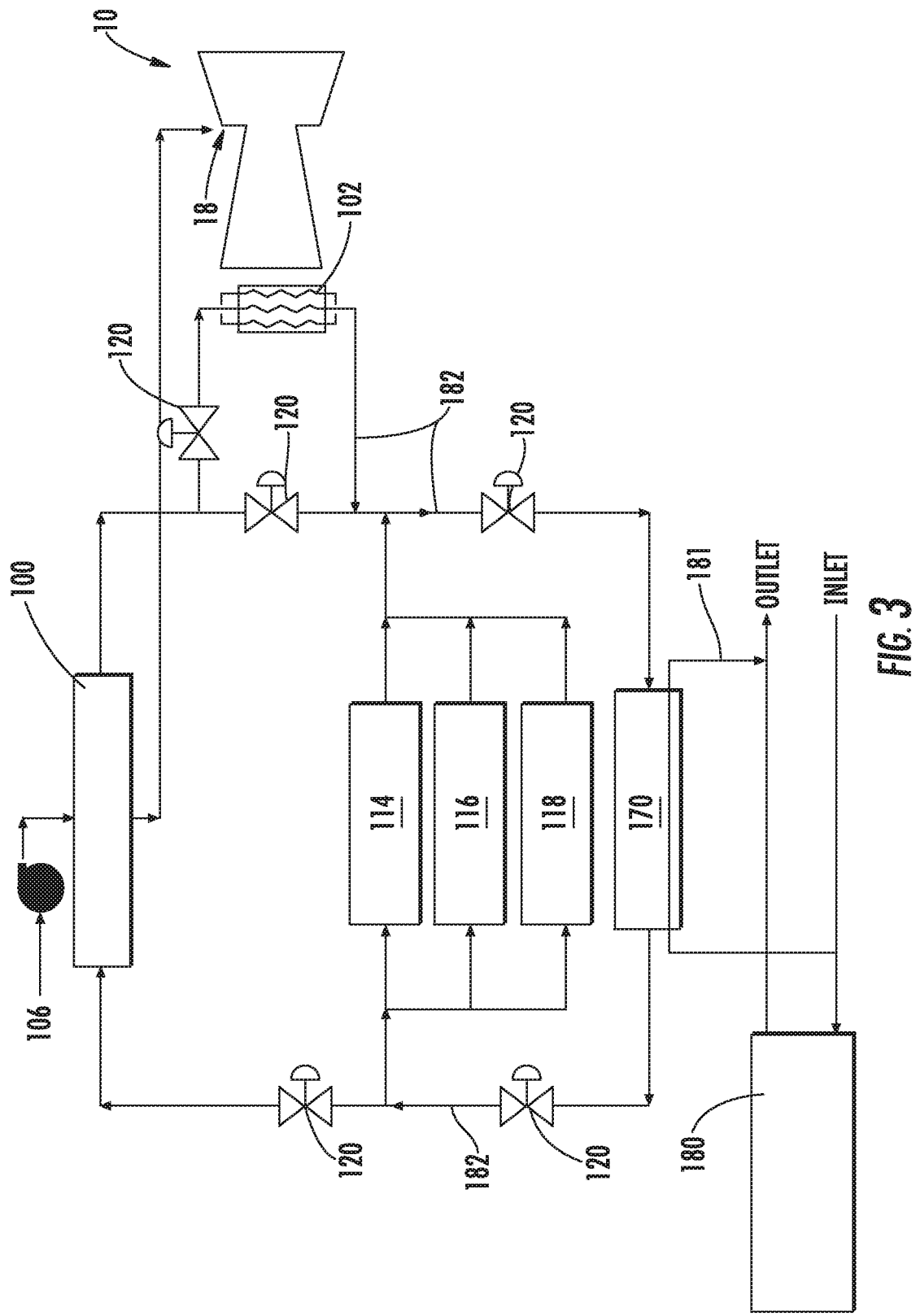
FIG. 3 is a schematic showing examples of auxiliary equipment cooled/heated by the CCW circuit in a combined cycle power plant.

Further shown in FIG. 1, the system disclosed herein uses LNG 106 from at least one refrigerated pressure vessel 112 and is pumped close to a turbine similar to fuel oil. Before being drawn into fuel gas performance heater 104, it passes through a vaporizer 100 where a controlled flow of closed cooling water (CCW) 182 will vaporize the LNG 106 and heat the NG 108 close to ambient temperature. The closed cooling water (CCW) 182 downstream of the vaporizer 100 can be controlled to a desired lower temperature, for example 50° F. or so. The closed cooling water (CCW) 182 is then used for gas turbine inlet air cooling and cooling other power plant equipment. The inlet air cooling methodology increases gross output and reduces heat rate considerably. For example, this system can provide about a 5% output increase and a 0.2% combined cycle system efficiency increase. The closed cooling water (CCW) 182 outlet from inlet air heating/cooling coil 110 can connect to other users as shown in FIG. 3 such as the lube oil heat exchanger, generator heat exchanger, etc. This system reduces auxiliary load for LNG vaporizer 100 imposed by, for example, the FG compressor, heating fluid pumping energy, etc. This system design also doesn't require a supplementary start up LNG vaporizing system and utilizes the available plant system to vaporize LNG without a supplementary system.

In this FIGS. 1 and 2 example, the gas turbine engine 10 further includes an inlet air heating and cooling system 102. The inlet air heating and cooling system 102 may be positioned about the compressor 12 and heats or cools the incoming airflow to a desired temperature. The inlet air heating and cooling system 102 may include a cooling/heating water coil 110. Hot or cold water flows through the coil 110 and exchanges heat with the incoming air 26. The inlet air heating and cooling system 102 may use any type of heat exchange device herein and may use a primary-secondary pumping system for chilled water temperature control. Cold closed cooling water generally may be provided by a LNG vaporizer while hot closed cooling water may be provided via a waste heat recovery system using heat recovered from an open cooling water circuit having, for example, a steam turbine condenser, a cooling tower, or other waste heat generators in an open cooling water circuit.

Inlet chilling can be modulated to achieve best plant performance. When gas turbine inlet chilling is not required for power augmentation, the LNG chilling capacity can be used to reduce open cooling water (OCW) 181 temperature to the at least one steam turbine condenser 180. This would similarly be the case when the LNG flow to the vaporizer 100 is greater than that necessary to provide ideal gas turbine inlet chilling, as for instance when most of the gas is feeding a branch gas pipeline instead of the power plant.

In this example, the gas turbine engine 10 may be part of a combined cycle power plant 80. As is shown in FIG. 1, the combined cycle power plant 80 uses the exhaust from the gas turbine engine 10 so as to generate steam in a heat recovery steam generator 85. The steam is used in turn to drive a steam turbine 90 and other components in a steam/condensate loop via a steam generator pump 95. A turbine inlet air heating and cooling system 102 may be used with any number of gas turbine engines 10. As described above, a cooling/heating water coil 110 may be positioned about the compressor 20 of each gas turbine engine 10. The cooling/heating water coil 110 heats or cools the inlet air via the closed cooling water (CCW) 182 running there through. Other types of heat exchange devices may be used herein.

In cooling mode, water or other types of fluids from the cooling/heating water coil 110 may be piped to a LNG/LPG vaporizer system 100. The vaporizer system 100 may directly exchange heat with the closed cooling water (CCW) 182 circuit. A conventional primary-secondary pumping system can be used for controlling temperatures to each user zone such as the generator cooler zone, lube oil cooler zone, and other balance-of-plant (BOP) zones for hydronic system control. Variable flow for the CCW system can also be provided by variable speed pumping. The closed cooling water (CCW) circuit 182 provides cold water to the cooling/heating water coil 110 where heat in the air flow is absorbed by the chilled water passing through the coil 110. Any number of vaporizers 100 and CCW pumps 125 may be used.

Open cooling water (OCW) 181 may be provided by a cooling tower 150 via one or more condenser water pumps 160. Other types of cooling water sources may be used herein. The cooling tower 150 may function as a heat sink or a heat source depending upon the overall system heat balance. Other types of heat exchange devices may be used herein. Warm water also may be provided to the cooling/heating coil 110 in a heating mode. The warm water may be provided via system waste heat or an external source. In this example, a heat recovery heat exchanger 170 may be used. Any type of heat exchange device may be used herein.

In the example shown in FIG. 1, the inlet air heating and cooling system 102 may use the waste heat of the steam generator 90 via the heat recovery heat exchanger 170. Specifically, water may be pumped from the cooling tower 150 via the condenser water pump 160 to at least one condenser 180 associated with the steam turbine 90. Part of the now warmed open cooling water 181 leaving the condenser 180 may flow through the heat recovery heat exchanger 170 so as to transfer heat with the closed cooling water (CCW) 182 fluid circulating through the cooling/heating coil 110 in the heating mode. The open cooling water 181 from the heat exchanger 170 then returns to the cooling tower 150. Other sources of waste heat may be used herein. The heat recovery heat exchanger 170 thus may provide water to the cooling/heating water coil 110 in the range of about 90 degrees Fahrenheit to about 120 degrees Fahrenheit (about 32 degrees Celsius to 49 degrees Celsius) via the recovered waste heat. Other configurations may be used herein.

The inlet air heating and cooling system 102 thus recovers waste heat for useful and effective purposes. This waste heat can improve turbine efficiency at part load, provide anti-icing control without the use of inlet bleed heat, reduce overall water consumption, provide freeze protection for the cooling/heating water coil 110 without the use of antifreeze, provide freeze protection for the inlet filters instead of conventional inlet housing deicing techniques, and other benefits. Further, these benefits are provided without a parasitic power drain on the system as a whole. Overall system efficiency thus may be increased.

FIG. 2 illustrates an example of a gas turbine 10 portion of a combined cycle power plant as may incorporate various embodiments. As shown, the gas turbine 10 generally includes a compressor section 12 having an inlet 14 disposed at an upstream end of the gas turbine 10, and a casing 16 that at least partially surrounds the compressor section 12. The gas turbine 10 further includes a combustion section 18 having a combustor 20 downstream from the compressor section 12, and a turbine section 22 downstream from the combustion section 18. As shown, the combustion section 18 may include a plurality of the combustors 20. A shaft 24 extends axially through the gas turbine 10.

In operation, air 26 is drawn into the inlet 14 of the compressor section 12 and is progressively compressed to provide a compressed air 28 to the combustion section 18. The compressed air 28 flows into the combustion section 18 and is mixed with fuel in the combustor 20 to form a combustible mixture. The combustible mixture is burned in the combustor 20, thereby generating a hot gas 30 that flows from the combustor 20 across a first stage 32 of turbine nozzles 34 and into the turbine section 22. The turbine section generally includes one or more rows of rotor blades 36 axially separated by an adjacent row of the turbine nozzles 34. The rotor blades 36 are coupled to the rotor shaft 24 via a rotor disk. A turbine casing 38 at least partially encases the rotor blades 36 and the turbine nozzles 34. Each or some of the rows of rotor blades 36 may be circumferentially surrounded by a shroud block assembly 40 that is disposed within the turbine casing 38. The hot gas 30 rapidly expands as it flows through the turbine section 22. Thermal and/or kinetic energy is transferred from the hot gas 30 to each stage of the rotor blades 36, thereby causing the shaft 24 to rotate and produce mechanical work. The shaft 24 may be coupled to a load such as a generator (not shown) so as to produce electricity. In addition or in the alternative, the shaft 24 may be used to drive the compressor section 12 of the gas turbine.

Closed cooling water (CCW) 182 from the LNG vaporizer 100 can also be used with multi-pressure condensation, as taught in commonly owned U.S. Pat. No. 8,250,848. Combined cycle efficiency and output are improved by either chilling the closed cooling water (CCW) 182 to one of two gas turbine combined cycles and not the other, or distributing the closed cooling water (CCW) 182 optimally to each of two series condensers on a single unit.

FIG. 3 is a schematic showing examples of equipment cooled/heated by the CCW 182 circuit in the combined cycle power plant 80. CCW 182 is cooled by the vaporizer 100 that vaporizes LNG/LPG 106 into natural gas 108 or propane gas that is fed to the combustion section 18 of the gas turbine 10. CCW 182 is pumped to the gas turbine inlet air heating and cooling system 102 and connected to the cooling/heating coil 110 to heat or cool inlet air to the gas turbine 10. Additional power plant equipment served by the CCW 182 circuit include at least one generator cooler 114, lube oil cooler 116, feedwater pump 118, as well as the heat recovery heat exchanger 170. The heat recovery heat exchanger 170 exchanges heat with the open cooling water 181 circuit such that the CCW 182 temperature is controlled in either heating or cooling mode depending on the power plant 80 operating parameters and ambient conditions. Temperature control is provided by control valves 120 and temperature sensors (not shown) positioned throughout the CCW 182 and OCW 181 piping system. The OCW 181 circuit can include at least one steam turbine condenser 180 to provide a heat source for the OCW 181 to heat the CCW 182 circuit.

Using the CCW as the only cooling recovery circuit benefits the power plant significantly. It can reduce the integration cost of the LNG/LPG vaporizer and power island by avoiding additional cooling circuits. Also, CCW water is typically demineralized water that minimizes heat exchanger fouling in the vaporizer, heat recovery heat exchanger and other heat rejection equipment. The CCW water quality can be maintained easily with a commercially available water treatment system.

The CCW circuit mass flow rate can be 20-30 times higher than the mass flow rate of the fuel gas to the gas turbine. This high CCW circuit mass flow rate allows the size/depth of the inlet air heating/cooling coil to be reduced thereby avoiding initial and operating cost as well as inlet air-side pressure drop. Additionally, the high CCW mass flow rate allows the vaporizer to maintain the CCW water temperature above freezing, above about 40 degrees F., to avoid or minimize requirements for freeze protection on both the CCW side and inlet air side. Conventional cryogenic cooling techniques, such as a sparging unit (not shown) coupled to the vaporizer and immersed in the CCW to dispense and sparge vaporized LNG bubbles in the CCW can also be used for freeze protection and temperature control of the CCW circuit. The sparging unit can be located upstream or downstream of the vaporizer. The sparging unit can be a multi tube apparatus that flows LNG bubbles through the CCW to cool the CCW.

Also, chilled CCW passing through the electric generator cooler decreases the log-mean temperature difference between the CCW and the generator coils thereby enabling more effective generator cooling and higher generator efficiency. Additionally, the chilled CCW can reduce generator cooling circuit design requirements thereby making the generator smaller and reduce cost.

The CCW circuit can also be cooled by the open cooling water system. As seen in FIG. 3, the CCW circuit can primarily be cooled using the LNG/LPG vaporizer, and when gas turbine inlet air cooling is not needed, the plant auxiliary heat rejection equipment (generator, lube oil, feed water pump, etc.) can be cooled by the CCW circuit without rejecting heat to the open cooling water system thereby reducing the load on the open cooling water system (Pump, Cooling Tower, Fans, etc.). Alternatively, the CCW circuit can slightly cool the open cooling water circuit to avoid heat rejection at the cooling tower, which can reduce the steam turbine condenser pressure and improve steam turbine performance.

During part-load operation and low ambient temperature conditions, when inlet air cooling is not beneficial, the inlet air heating/cooling system can switch to heating mode using heat supplied by the plant heat rejection. The CCW temperature can be about 10 to 40 degrees F. higher than ambient temperature thereby heating the inlet air temperature for gas turbine performance improvement. This heating mode avoids using heat extraction from the HRSG so the bottoming cycle performance remains constant and the gas turbine performance increases.

A method for improving the output and heat rate of a LNG fired combined cycle power plant can have the steps of; supplying liquid natural gas to a vaporizer configured to vaporize the liquid natural gas into natural gas that is supplied to a gas performance heater before entering a combustion section of a gas turbine, vaporizing the liquid natural gas so that vaporized cooling is recovered by a closed cooling water circuit and transferred to at least one cooled power plant component, and exchanging heat in a heat recovery heat exchanger between the closed cooling water circuit and an open cooling water circuit that is in fluid communication with at least one power plant component comprising at least one steam turbine condenser, wherein, the at least one steam turbine condenser is configured so that waste heat is recovered by the open cooling water circuit and transferred to at least one heated power plant component via the heat recovery heat exchanger. Steam can be supplied from a heat recovery steam generator that is in fluid communication with at least one power plant component comprising the gas performance heater, the gas turbine, the at least one steam turbine condenser, and mixtures thereof.

This written description uses examples to disclose the invention, including the best mode, and also to enable any person skilled in the art to practice the invention, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A heating and cooling system for a combined cycle power plant, comprising:

a liquid natural gas supply and a vaporizer configured to vaporize a liquid natural gas into natural gas that is supplied to a gas performance heater before entering a combustion section of a gas turbine;

a closed cooling water circuit in fluid communication with a gas turbine inlet heating/cooling coil, a heat recovery heat exchanger, the vaporizer, and a sparging unit;

wherein the vaporizer is coupled to the closed cooling water circuit, whereby cooling is transferred to the closed cooling water circuit from the vaporizer for cooling of at least one of the gas turbine inlet heating/cooling coil, the heat recovery heat exchanger, the vaporizer, and the sparging unit;

an open cooling water circuit in fluid communication with the heat recovery heat exchanger and at least one steam turbine condenser;

wherein the heat recovery heat exchanger is coupled to the closed cooling water circuit, and whereby waste heat from the at least one steam turbine condenser is transferred to the closed cooling water circuit via the heat recovery heat exchanger for heating of at least one of the gas turbine inlet heating/cooling coil, the heat recovery heat exchanger, the vaporizer, and the sparging unit, wherein the gas turbine inlet heating/cooling coil consists of a single air inlet heating/cooling coil.

2. The heating and cooling system of claim 1, wherein the open cooling water circuit is in fluid communication with at least one cooling tower.

3. The heating and cooling system of claim 1, wherein the liquid natural gas supply further comprises at least one refrigerated pressure vessel.

4. The heating and cooling system of claim 1, further comprising a heat recovery steam generator in fluid communication with at least one of the gas performance heater, the gas turbine, and the at least one steam turbine condenser.

5. The heating and cooling system of claim 4, wherein the at least one steam turbine condenser is configured for multi-pressure condensation.

6. The heating and cooling system of claim 4, wherein the closed cooling water circuit is in fluid communication with a generator cooler, a lube oil cooler, a feedwater pump, the at least one steam condenser, the gas turbine inlet heating/cooling coil, or mixtures thereof.

7. The heating and cooling system of claim 4, further comprising a piping system configured with at least one of conventional primary-secondary pumping and variable speed pumping.

8. The heating and cooling system of claim 1, wherein the heat recovery heat exchanger provides closed cooling water to the at least one of the vaporizer and the gas turbine inlet heating/cooling coil in the range of 90 degrees Fahrenheit to 120 degrees Fahrenheit.

\* \* \* \* \*